US012446892B2

(12) United States Patent
Fago

(10) Patent No.: US 12,446,892 B2
(45) Date of Patent: Oct. 21, 2025

(54) DUAL SIDE SPRING V-CLIP FOR SURGICAL TREATMENT OF LEFT ATRIAL APPENDAGE

(71) Applicant: AtriCure, Inc., Mason, OH (US)

(72) Inventor: Frank Fago, Mason, OH (US)

(73) Assignee: AtriCure, Inc., Mason, OH (US)

( * ) Notice: Subject to any disclaimer, the term of this patent is extended or adjusted under 35 U.S.C. 154(b) by 108 days.

(21) Appl. No.: 18/464,114

(22) Filed: Sep. 8, 2023

(65) Prior Publication Data

US 2025/0082339 A1    Mar. 13, 2025

(51) Int. Cl.
   *A61B 17/122* (2006.01)
   *A61B 17/00* (2006.01)
   *A61B 17/128* (2006.01)

(52) U.S. Cl.
   CPC ...... *A61B 17/1227* (2013.01); *A61B 2017/00243* (2013.01); *A61B 17/1285* (2013.01)

(58) Field of Classification Search
   CPC ........... A61B 17/128; A61B 17/1285; A61B 17/1227; A61B 17/122; A61B 17/1222
   See application file for complete search history.

(56) References Cited

U.S. PATENT DOCUMENTS

| | | | |
|---|---|---|---|
| 7,645,285 B2 | 1/2010 | Cosgrove et al. | |
| 7,931,578 B2 | 4/2011 | Whayne et al. | |
| 8,465,507 B2 | 6/2013 | Cosgrove et al. | |
| 8,636,754 B2 | 1/2014 | Hughett et al. | |
| 8,715,302 B2 | 5/2014 | Ibrahim et al. | |
| 8,814,778 B2 | 8/2014 | Kiser et al. | |
| 8,852,218 B2 | 10/2014 | Hughett et al. | |
| 8,945,151 B2 | 2/2015 | Salas | |
| 9,017,349 B2 | 4/2015 | Privitera et al. | |
| 9,119,627 B2 | 9/2015 | Cosgrove et al. | |
| 9,265,486 B2 | 2/2016 | Hughett et al. | |
| 9,282,973 B2 | 3/2016 | Hughett et al. | |
| 9,393,023 B2 | 7/2016 | Privitera et al. | |
| 9,463,024 B2 | 10/2016 | Kiser et al. | |
| 9,861,371 B2 | 1/2018 | Martin et al. | |
| 9,883,863 B2 | 2/2018 | Hughett et al. | |

(Continued)

FOREIGN PATENT DOCUMENTS

WO    WO 2023/039574    3/2023

OTHER PUBLICATIONS

U.S. Appl. No. 16/536,936, filed Aug. 9, 2019, Privitera et al.
(Continued)

*Primary Examiner* — Wade Miles
(74) *Attorney, Agent, or Firm* — Levine Bagade Han LLP

(57) ABSTRACT

A clip and method provide for surgically minimizing or eliminating an atrial appendage of the patient using a clip. The clip includes first and second elongate beam. The clip includes a dual side spring assembly configured to urge the first and the second elongate beams from an open V-shaped position to a parallel closed position. The dual side spring assembly includes a right-side spring and a left-side spring having first and second terminal ends attached to distal sections respectively of the first and the second elongate beams. The right and the left-side springs extend proximally to a respective proximal bend connected by a lateral element that maintains alignment to resist lateral splaying movement of the first and the second elongate beams.

7 Claims, 6 Drawing Sheets

(56) References Cited

U.S. PATENT DOCUMENTS

| | | |
|---|---|---|
| 9,883,867 B2 | 2/2018 | Martin et al. |
| 9,888,925 B2 | 2/2018 | Bertolero et al. |
| 9,901,352 B2 | 2/2018 | Fago et al. |
| 10,098,640 B2 | 10/2018 | Bertolero et al. |
| 10,166,024 B2 | 1/2019 | Williamson et al. |
| 10,182,823 B2 | 1/2019 | Miller |
| 10,182,824 B2 | 1/2019 | Monti et al. |
| 10,238,398 B2 | 3/2019 | Hughett et al. |
| 10,278,704 B2 | 5/2019 | Kiser et al. |
| 10,285,712 B2 | 5/2019 | Cosgrove et al. |
| 10,314,585 B2 | 6/2019 | Williamson et al. |
| 10,426,475 B2 | 10/2019 | Privitera et al. |
| 10,433,854 B2 | 10/2019 | Miller et al. |
| 10,524,791 B2 | 1/2020 | Bertolero et al. |
| 10,631,874 B2 | 4/2020 | Martin et al. |
| 10,758,243 B2 | 9/2020 | Salas |
| 10,869,668 B2 | 12/2020 | Privitera et al. |
| 10,898,204 B2 | 1/2021 | Winkler et al. |
| 10,918,392 B2 | 2/2021 | Deville et al. |
| 11,191,547 B2 | 12/2021 | Deville et al. |
| 11,266,413 B2 | 3/2022 | Winkler et al. |
| 11,284,899 B2 | 3/2022 | Ibrahim et al. |
| 11,324,510 B2 | 5/2022 | Morejohn et al. |
| 2009/0240266 A1* | 9/2009 | Dennis ............... A61B 17/1285 606/151 |
| 2019/0357912 A1 | 11/2019 | Privitera et al. |
| 2021/0038226 A1 | 2/2021 | Bales et al. |
| 2021/0106336 A1 | 4/2021 | Winklier et al. |
| 2022/0361886 A1 | 11/2022 | Widenhouse et al. |
| 2023/0009892 A1 | 1/2023 | Winklier et al. |
| 2023/0023804 A1 | 1/2023 | Hughett et al. |
| 2023/0083170 A1 | 3/2023 | Biehle et al. |
| 2023/0083697 A1 | 3/2023 | Recker et al. |
| 2023/0083738 A1 | 3/2023 | Ziton et al. |
| 2023/0087254 A1 | 3/2023 | Seith et al. |

OTHER PUBLICATIONS

U.S. Appl. No. 17/131,975, filed Dec. 23, 2020, Winklier et al.
U.S. Appl. No. 17/676,516, filed Feb. 21, 2022, Winkler et al.
U.S. Appl. No. 17/875,582, filed Jul. 28, 2022, Widenhouse et al.
U.S. Appl. No. 17/931,305, filed Mar. 16, 2023, Mata et al.
U.S. Appl. No. 17/931,309, filed Sep. 12, 2022, Recker et al.
U.S. Appl. No. 17/931,316, filed Sep. 12, 2022, Ziton et al.
U.S. Appl. No. 17/931,324, filed Sep. 12, 2023, Biehle et al.
U.S. Appl. No. 17/958,347, filed Oct. 1, 2022, Hughett et al.
U.S. Appl. No. 18/464,121, filed Sep. 8, 2023, Fago.

* cited by examiner

DUAL SIDE SPRING V-CLIP FOR SURGICAL TREATMENT OF LEFT ATRIAL APPENDAGE

CROSS-REFERENCE TO RELATED APPLICATIONS

The present application is related to co-pending application U.S. patent application Ser. No. 18/464,121 filed on Sep. 8, 2023 as the present application by inventor Frank Fago. The co-pending application is thereby incorporated herein by reference.

FIELD OF THE INVENTION

The present disclosure is directed to implantable medical devices, and, more specifically, to implantable exclusion devices for anatomical structures, and related instruments and related methods.

BACKGROUND OF THE INVENTION

The present disclosure contemplates that atrial fibrillation is a common heart arrhythmia, affecting millions of people in the United States. In some patients with atrial fibrillation, stagnant blood in the heart's left atrial appendage ("LAA") may be a source of blood clots, which may enter the blood circulation and increase the risk of stroke. Excluding the LAA, which may create electrical and/or fluidic isolation of the LAA, may be beneficial in terms of reducing the atrial fibrillation burden and/or reducing the risk of stroke for some patients. Accordingly, in some patients, it may be desirable to exclude the LAA by securely sealing the LAA orifice at the base of the LAA using an occlusion device. Generally known LAA clips are surgically implanted concomitant with other open thoracic surgical procedures such as coronary artery bypass graft surgery (CABG).

SUMMARY OF THE INVENTION

According to one aspect of the present disclosure, an apparatus such as an occlusion clip is provided for eliminating or mitigating a tissue appendage of a patient. The clip includes a first elongate beam. The clip includes a second elongate beam positionable between a closed state in parallel alignment with the first elongate beam and an open state being a distally angled away from the first elongate beam in a V-shape. The clip includes a dual side spring assembly configured to urge the first and the second elongate beams from the open position to the closed position. The dual side spring assembly includes a right-side spring and a left-side spring having first and second terminal ends attached to distal sections respectively of the first and the second elongate beams. The right and the left-side springs extend proximally to a respective proximal bend that is configured to resist lateral splaying movement by one or more of: (i) a lateral attachment between the bends of the right and the left-side springs; and (ii) a laterally wider cross section of the right and the left-side springs.

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

DETAILED DESCRIPTION

Figure 1A:
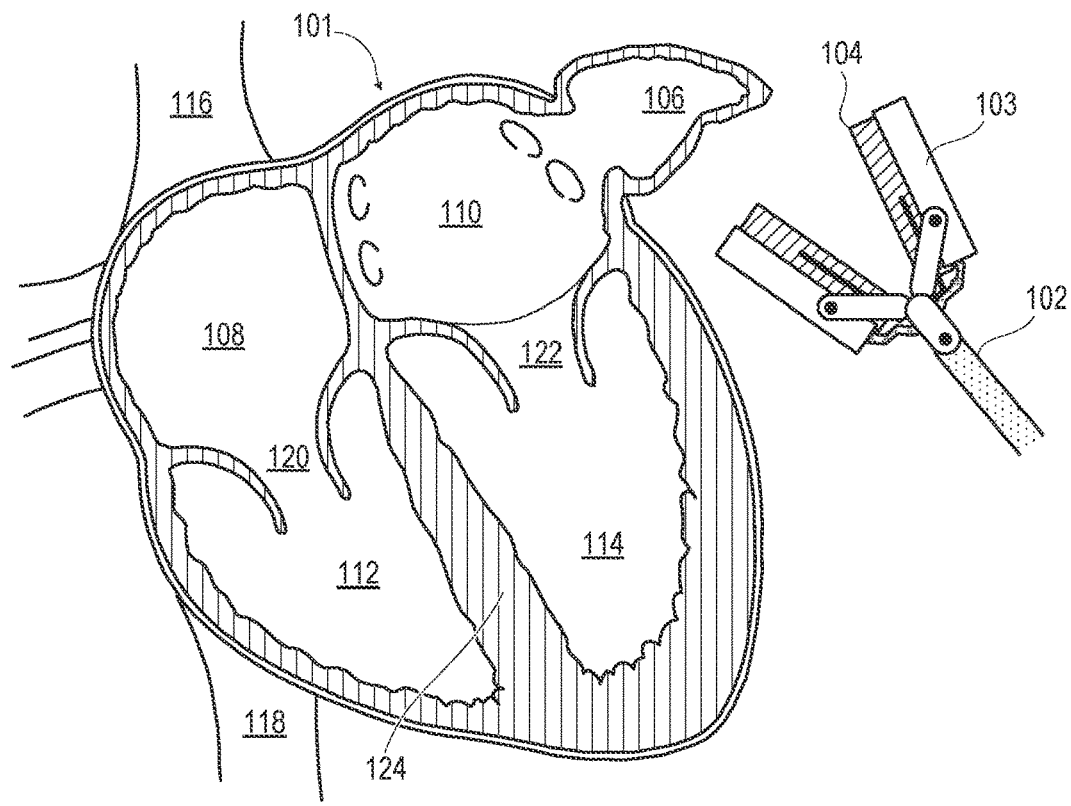
FIG. 1A is a cross section view of a human heart that is being approached by a V-clip applier having an end effector in an open position that holds a dual side spring V-clip for treatment of a left atrial appendage (LAA) to prevent certain types of ischemic stroke, according to one or more embodiments.

According to aspects of the present disclosure, a dual side spring V-clip and method provide for surgically minimizing or eliminating an atrial appendage of the patient using the V-clip. The clip includes a first elongate beam and a second elongate beam. The clip includes a dual side spring assembly configured to urge the first and the second elongate beams from an open V-shaped position to a parallel closed position. The dual side spring assembly includes a right-side spring and a left-side spring having first and second terminal ends attached to distal sections respectively of the first and the second elongate beams. The right and the left-side springs extend proximally to a respective proximal bend connected by a lateral element that maintains alignment to resist lateral splaying movement of the first and the second elongate beams.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, that executes to provide a specific utility for the device or a specific functional logic. The presented figures illustrate hardware components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1A is a cross section view of a human heart 101 that can be approached by an applier mechanism or V-clip applier 102 having an end effector 103. The end effector 103 can be in an open position during approach. The end effector 103 can hold a side spring V-clip 104 for treatment of a left atrial appendage (LAA) 106 to prevent certain types of stroke. The side spring V-clip 104 can be an apparatus for occluding the LAA 106.

The human heart 101 has four chambers: (i) right atria (RA) 108; (ii) left atria (LA) 110; (iii) right ventricle (RV) 112; and left ventricle (LV) 114. The RA 108 receives blood from the venous vasculature. Venous blood enters the RA 108 from the superior vena cava (SVC) blood vessel 116 and the inferior vena cava (IVC) blood vessel 118. Normal pumping of the heart 101 causes blood in the RA 108 to flow through the tricuspid valve (TV) 120 into the right ventricle (RV) 112. Blood in the RV 112 is expelled from the heart 101 into the pulmonary artery. Blood expelled into the pulmonary artery flows into the lungs where the blood is oxygenated and thereafter flows back to the LA 110. The oxygenated blood in the LA 110 flows through the mitral valve (MV) 122 into the LV 114. Blood in the LV 114 is then expelled out of the heart 101 into the ascending aorta and from there to smaller vessels of the systemic circulation. A wall of the heart 101, referred to as a septum 124, separates right and left-sides of the heart 101. The RA 108 and LA 110 are separated by an upper atrial portion of the septum 124. The RV 112 and LV 114 are separated by a lower thicker ventricular portion of the septum 124. The LAA 106 extends off of the LA 110 and is a blind-ended structure.

Figure 1B:
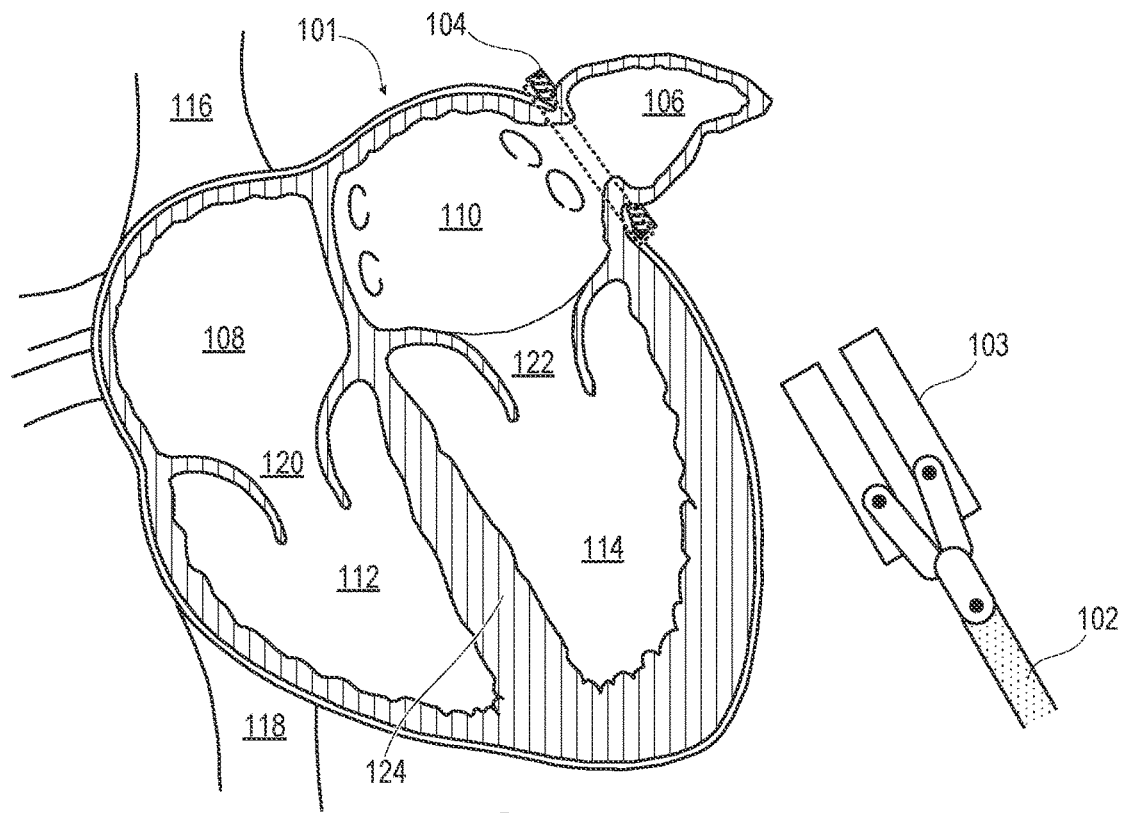
FIG. 1B is a cross section of the human heart after dispensing of the dual side spring V-clip by the V-clip applier, according to one or more embodiments.

FIG. 1B is a cross section of the human heart 101 after dispensing of the side spring V-clip 104 by the V-clip applier 102. The end effector 103 of the V-clip applier 102 can be in a closed position, reducing the size of the end effector 103 for retraction from the patient. The clip 104 closed on the LAA 106 can eliminate or minimize the LAA 106 to reduce stroke risk among other benefits. Aspects of the present disclosure can provide an alternative biasing approach for the clip and dispenser as disclosed for example in U.S. Pat. No. 8,852,218, the disclosure of which is hereby incorporated by reference in its entirety to the extent compatible with the teaching herein.

Figure 2:
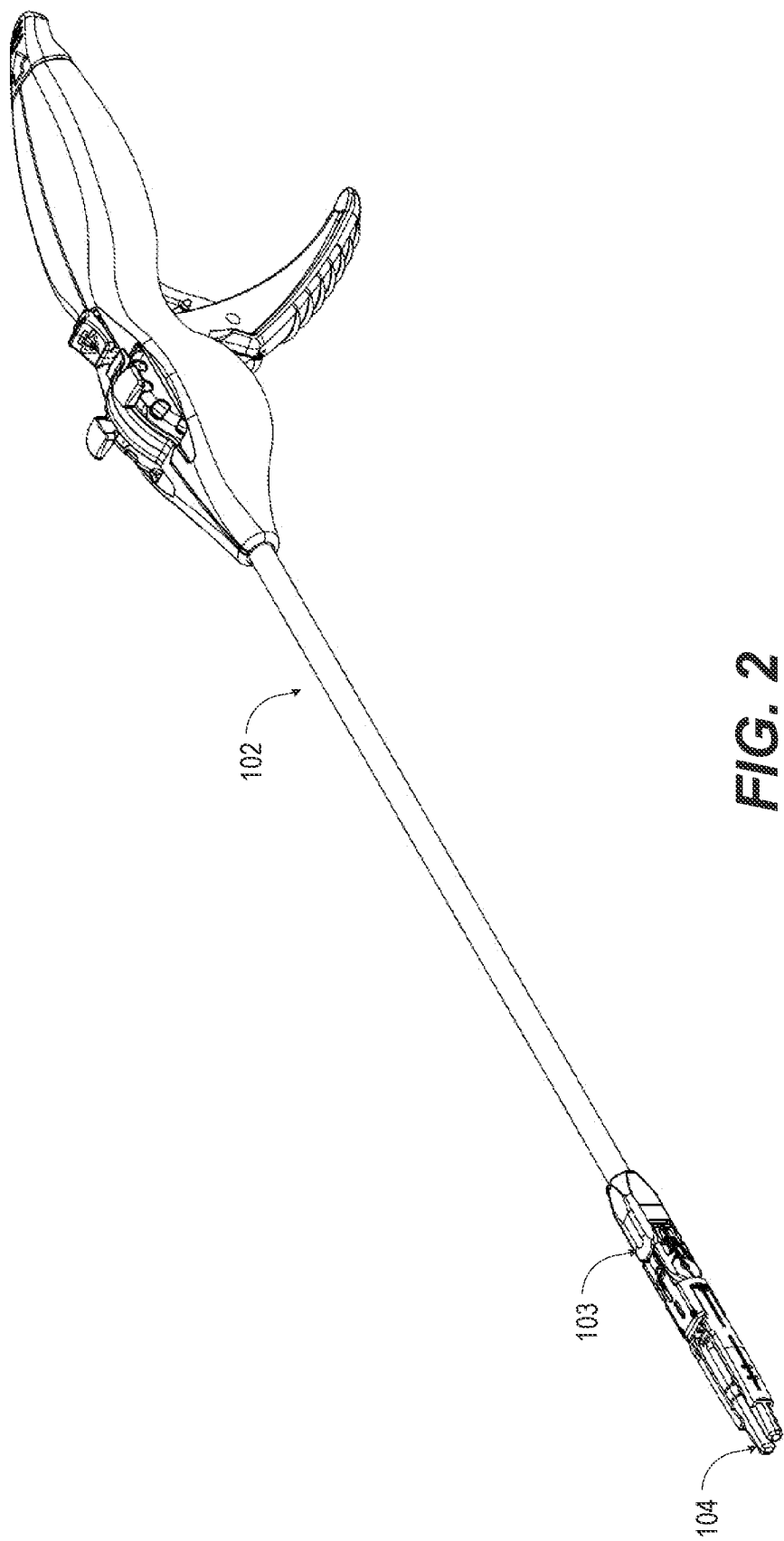
FIG. 2 is a three-dimensional view of V-clip applier with an end effector holding the dual side spring V-clip, according to one or more embodiments.

FIG. 2 is a three-dimensional view of the V-clip applier 102 with an end effector 103 holding the dual side spring V-clip 104. In this example, the V-clip applier 102 can be similar or identical to embodiments disclosed in U.S. Pat. No. 9,883,867 B2, the disclosure of which is hereby incorporated by reference in its entirety.

Figure 3:
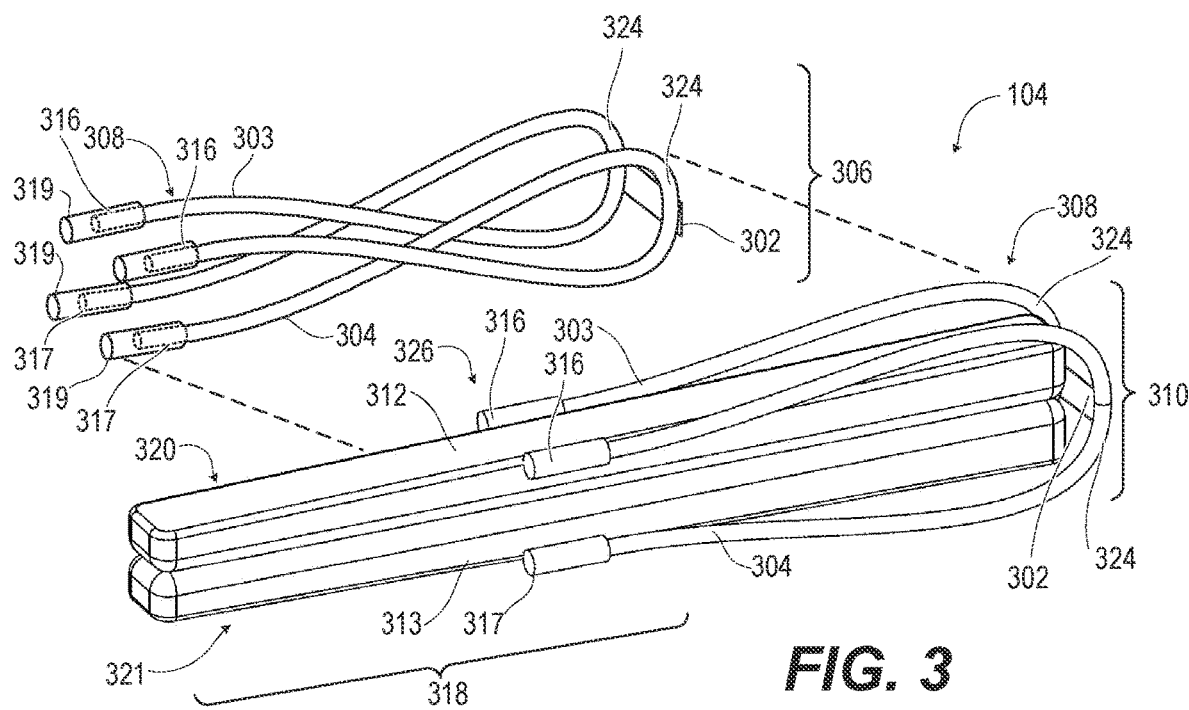
FIG. 3 is a three-dimensional view of an example dual side spring V-clip having a lateral spacing element to maintain parallel alignment of side springs, preventing splaying apart after deployment, according to one or more embodiments.

FIG. 3 is a three-dimensional view of an example dual side spring V-clip 104 having a lateral spacing element 302 to prevent splaying apart of the right side spring 303 and the left-side spring 304 after deployment. In one or more embodiments, the V-clip 104 is symmetrical around the horizontal center plane so right and left are relative.

Figure 4:
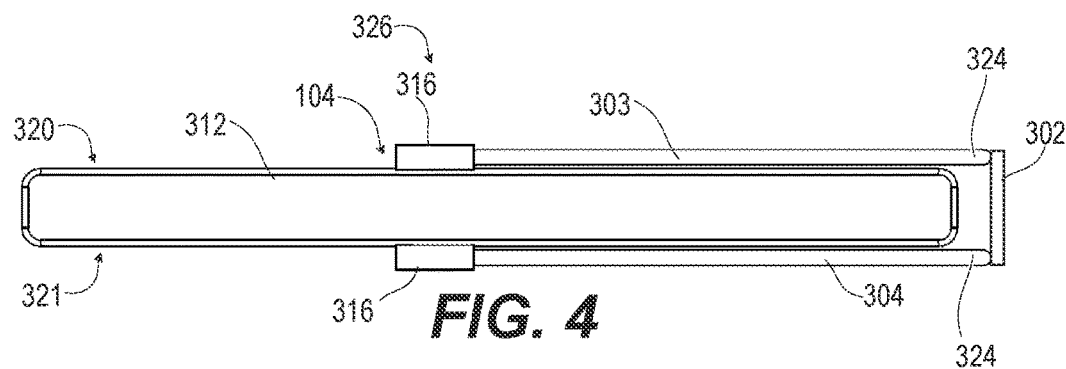
FIG. 4 is a top view of the example dual spring V-clip having laterally aligned spring attachments to beams, according to one or more embodiments.

FIG. 4 is a top view of the example dual spring V-clip having laterally aligned spring attachments to beams. With particular reference to FIG. 3, at 306, a dual side spring assembly 308 stabilized by lateral spacing element 302 is depicted with the right side spring 303 and the left-side spring 304 in a relaxed state. The stabilized side spring assembly 308 can be attached to other components of the dual side spring V-clip 104 at section 310.

In one or more embodiments, the dual side spring V-clip 104 provides as clamping members a first elongate beam 312 and a second elongate beam 313. The second elongate beam can be positionable between a closed state in parallel alignment with the first elongate beam 312 and an open state being a distally angled away from the first elongate beam 312 in a V-shape. The dual side spring assembly 308 can be configured to urge the first elongate beam 312 and the second elongate beam 313 from the open position to the closed position. The lateral spacing element 302 can be substantially perpendicular to first elongate beam 312 and a second elongate beam 313.

The right-side spring 303 and the left-side spring 304 can each comprise a first terminal end 316 and a second terminal end 317 attached to distal sections 318 respectively at right side 320 and left side 321 of the first elongate beam 312 and the second elongate beam 313. The first terminal end 316 and the second terminal end 317 of the right-side spring 303 and the left-side spring 304 can be received in an overmolded attachment 319 of a corresponding first elongate beam 312 and the second elongate beam 313. In some embodiments, the first terminal end 316 and the second terminal end 317 of the right-side spring 303 and the left-side spring 304 can be integral with the corresponding first elongate beam 312 and the second elongate beam 313.

When detached, the right-side spring 303 and the left-side spring 304 can relax to a crossed single coil spring position. When attached at section 310, from the first terminal end 316 and the second terminal end 317, the right-side spring 303 and the left-side spring 304 extend proximally to a respective proximal bend 324, forming generally a two-dimensional bulb shape. The lateral spacing element 302 can be attached at respective proximal bends 324 of the right-side spring 303 and the left-side spring 304 and can extend between the right-side spring 303 and the left-side spring 304 to maintain parallel alignment and thus to resist lateral splaying movement of the first elongate beam 312 and the second elongate beam 313 of the dual spring V-clip 104. The terminal end 316 and the second terminal end 317 of the right-side spring 303 can be vertically aligned at a first longitudinal position 326 on right sides 320 respectively of the first elongate beam 312 and the second elongate beam 313. The first terminal end 316 and the second terminal end 317 of the left-side spring 304 can be vertically aligned at the first longitudinal position 326 on left-sides 321 respectively of the first elongate beam 312 and the second elongate beam 313. The right-side spring 303 and the left-side spring 304 can be identically sized.

The first elongate beam 312 and the second elongate beam 313 can comprise atraumatic inward surfaces 332, 333. The geometry of the clamping portion interface between the clip beam and the appendage can be atraumatic. Patients that require the V-clip 104 already have compromised cardiac systems so the appendage can be friable. Accordingly, the clip 104 can comprise a contact surface that does not create stress concentrations that could abrade or cut the appendage.

Additional information is provided in the commonly owned U.S. patent application Ser. No. 17/931,309 filed on 12 Sep. 2022 and entitled "Exclusion Device Beams and Related Methods", the disclosure of which is hereby incorporated by reference in its entirety. In particular, more detail is provided regarding beam shape and surface texture possibilities. The atraumatic clamping surface texture does not tend to abrade the beating heart especially with direct contact to the tissue.

In one or more embodiments, the clip 104 can have a texture that interfaces with a knit braided polyester fabric cover to increase friction and keep the clip in place until the tissue grows into the fabric and clip. The polyester cover can provide a smooth uniform contact area that minimizes trauma to the appendage. The first elongate beam 312 and the second elongate beam 313 can include or be wholly composed of one or more materials compatible with surgical implantation on a left atrial appendage of a heart of a patient.

In one or more embodiments, the right-side spring 303 and the left-side spring 304 can each have a round spring design and are maintained in parallel alignment by the lateral spacing element 302 to ensure that the clamping members, depicted as first elongate beam 312 and second elongate beam 313 are lined up with each other to transfer force to the appendage (LAA 106 of FIG. 1A). If the clamping members are not lined up, the round side springs are not required to apply a restoring lateral force due to alignment provided by the lateral spacing element 302. By maintaining parallel alignment of right-side spring 303 and the left-side spring 304, the first elongate beam 312 and the second elongate beam 313 can comprise consistent force along the length of the beams and may not exclude the appendage completely.

Figure 5:
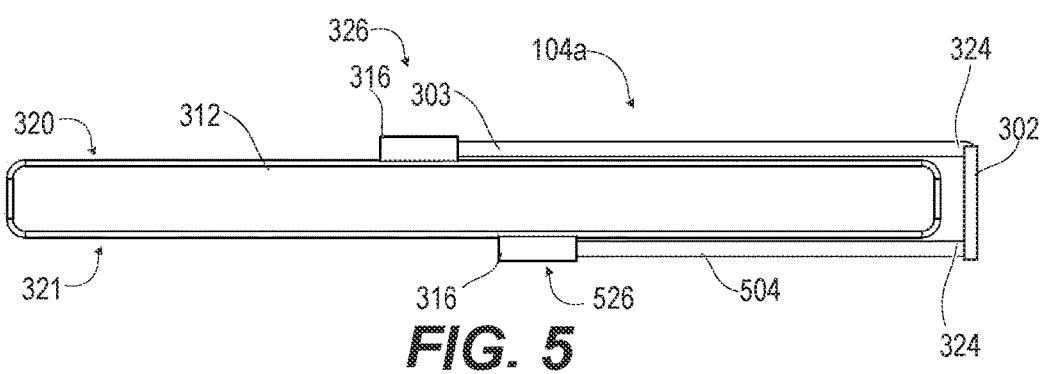
FIG. 5 is a top view of an alternative dual spring V-clip having longitudinally displaced spring attachments to beams, according to one or more embodiments.

FIG. 5 is a top view of an alternative dual spring V-clip 104a having longitudinally displaced spring attachments to the first elongate beam 312 and the second elongate beam 313. The first terminal end 316 and the second terminal end 317 of the right-side spring 303 can be vertically aligned at the first longitudinal position 326 on right sides 320 respectively of the first elongate beam 312 and the second elongate beam 313. The first terminal end 316 and the second terminal end 317 of the left-side spring 304 can be vertically aligned at a second longitudinal position 526 on left-sides 321 respectively of the first elongate beam 312 and the second elongate beam 313. The second longitudinal position 526 can be longitudinally spaced from the first longitudinal position 326. The right-side spring 303 and the left-side spring 304 can be sized differently or identically. In some embodiments, the left-side spring 304 can be longitudinally shorter than the right-side spring 303.

Figure 6:
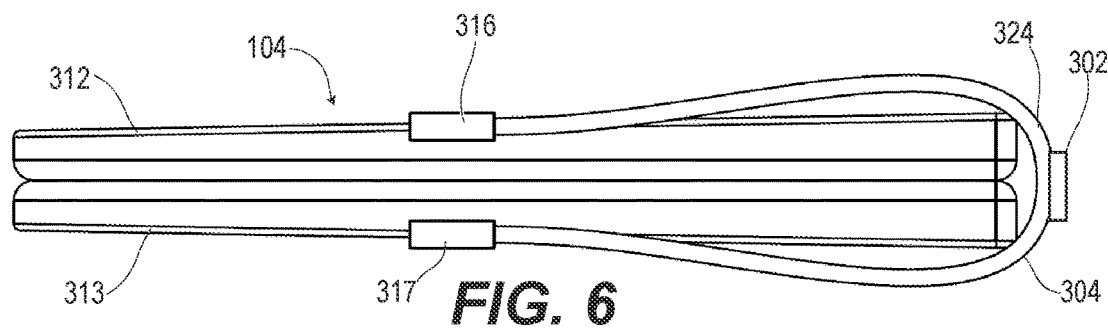
FIG. 6 is a side view of the example dual spring V-clip of FIG. 5 in a closed position, according to one or more embodiments.
Figure 7:
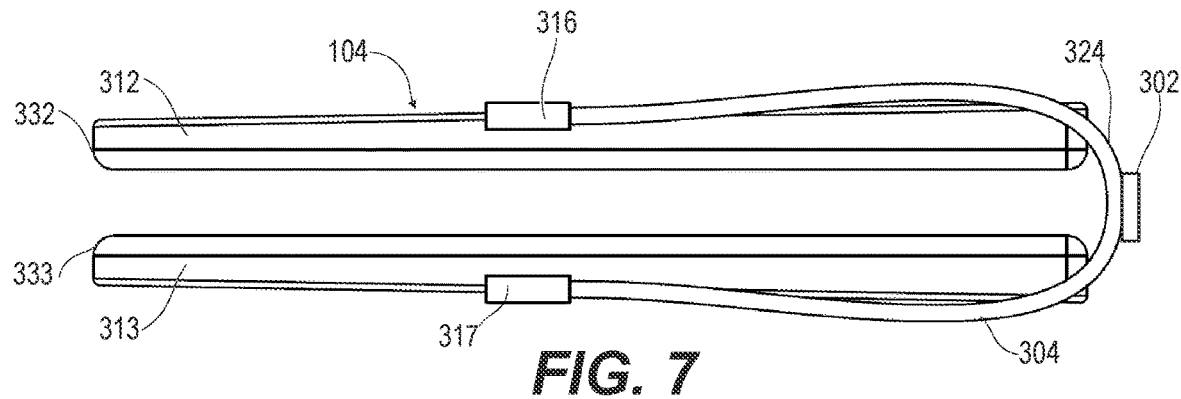
FIG. 7 is a side view of the example dual spring V-clip of FIG. 5 in an open position, according to one or more embodiments.
Figure 8:
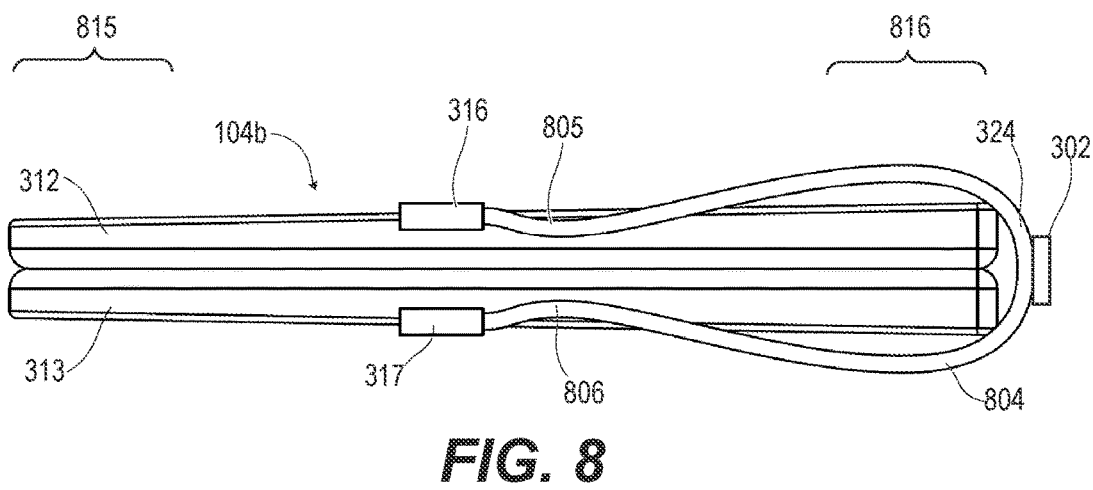
FIG. 8 is a side view of an alternate dual spring V-clip in a closed position and with double bent side springs, according to one or more embodiments.

FIG. 6 is a side view of the example dual spring V-clip 104 of FIG. 5 in a closed position. FIG. 7 is a side view of the example dual spring V-clip 104 of FIG. 5 in a partially open position. FIG. 8 is a side view of an alternate dual spring V-clip 104b in a closed position and with double bent side springs 804. In a detached, relaxed state, each alternate dual side spring 804 can comprise crossed distal ends similar to as depicted at 308 of FIG. 3. The side springs 804 can comprise a top reverse bend 805 distal to first terminal end 316 and a bottom reverse bend 806 proximal to second terminal end 317 as compared to the proximal bend 324 at a midpoint. The top reverse bend 805 and the bottom reverse bend 806 can enable approximately equal force to be applied to both the proximal end 815 and the distal end 816 of the first elongate beam 312 and the second elongate beam 313.

To facilitate an over-molding production method, the ends of the springs can have features to constrain them. The springs can be inserted into the injection molding tool so the beams can be molded and formed around the spring ends. The springs can be constrained from both rotation and axial motion. Shapes that prevent the springs from rotating can include at least one flat, a hole through the spring for plastic to flow, a spline, or a swaged section. Additionally, a shape on the spring such as an undercut can constrain the spring in the axial direction.

Figure 9A:
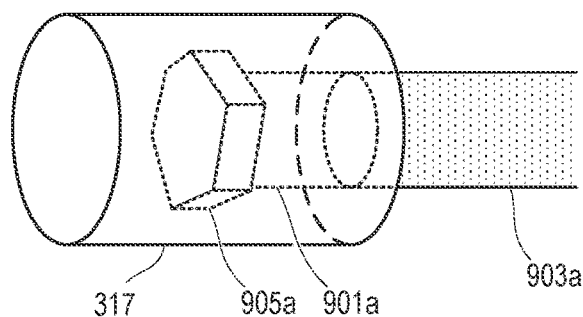
FIG. 9A is a three-dimensional view of spring end having a hexagonal head anti-rotation feature that is encompassed within an overmolded attachment of a beam, according to one or more embodiments.
Figure 9B:
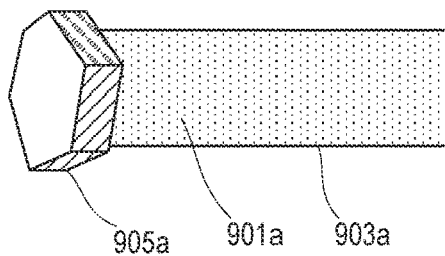
FIG. 9B is a three-dimensional view of the spring end of FIG. 9A, according to one or more embodiments.
Figure 9C:
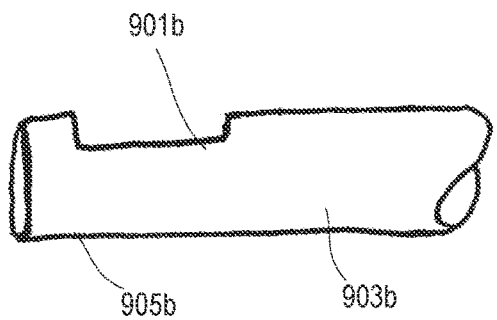
FIG. 9C is a three-dimensional view of an example spring end having an undercut anti-rotation feature, according to one or more embodiments.
Figure 9D:
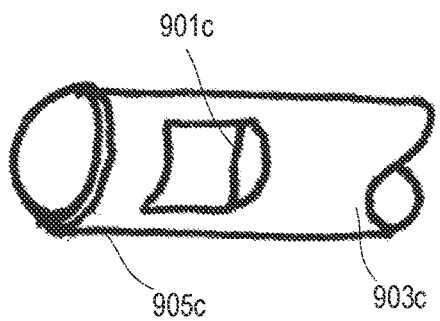
FIG. 9D is a three-dimensional view of an example spring end having a flat anti-rotation feature, according to one or more embodiments.
Figure 9E:
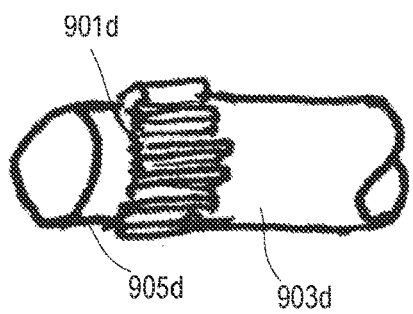
FIG. 9E is a three-dimensional view of an example spring end having a spline anti-rotation feature, according to one or more embodiments.
Figure 9F:
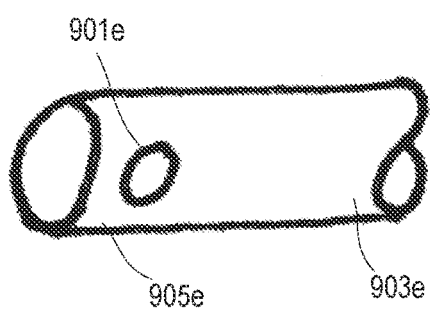
FIG. 9F is a three-dimensional view of an example spring end having a lateral through hole anti-rotation feature, according to one or more embodiments.
Figure 9G:
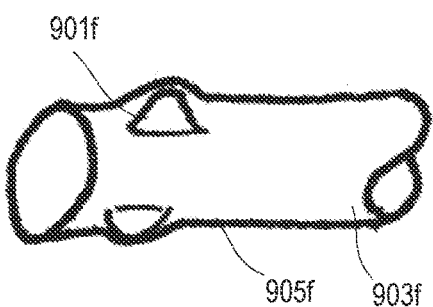
FIG. 9G is a three-dimensional view of an example spring end having a swage anti-rotation feature, according to one or more embodiments.

FIG. 9A is a three-dimensional view of an example spring end 901*a* of a side spring 903*a* having an anti-rotation feature 905*a*, depicted as a hexagonal head, which can be encompassed within an overmolded attachment 319 of the beam 312 (FIG. 3). FIG. 9B is a three-dimensional view of the spring end 901*a* of FIG. 9A. FIG. 9C is a three-dimensional view of an example spring end 901*b* of a side spring 903*b* having an anti-rotation feature 905*b*, depicted as an undercut anti-rotation feature. FIG. 9D is a three-dimensional view of an example spring end 901*c* of a side spring 903*c* having an anti-rotation feature 905*c*, depicted as a flat anti-rotation feature. FIG. 9E is a three-dimensional view of an example spring end 901*d* of a side spring 903*d* having an anti-rotation feature 905*d*, depicted as a spline anti-rotation feature. FIG. 9F is a three-dimensional view of an example spring end 901*e* of a side spring 903*e* having an anti-rotation feature 905*e*, depicted as a lateral through hole anti-rotation feature. FIG. 9G is a three-dimensional view of an example spring end 901*f* of a side spring 903*f* having an anti-rotation feature 905*f*, depicted as a swage anti-rotation feature.

Figure 10:
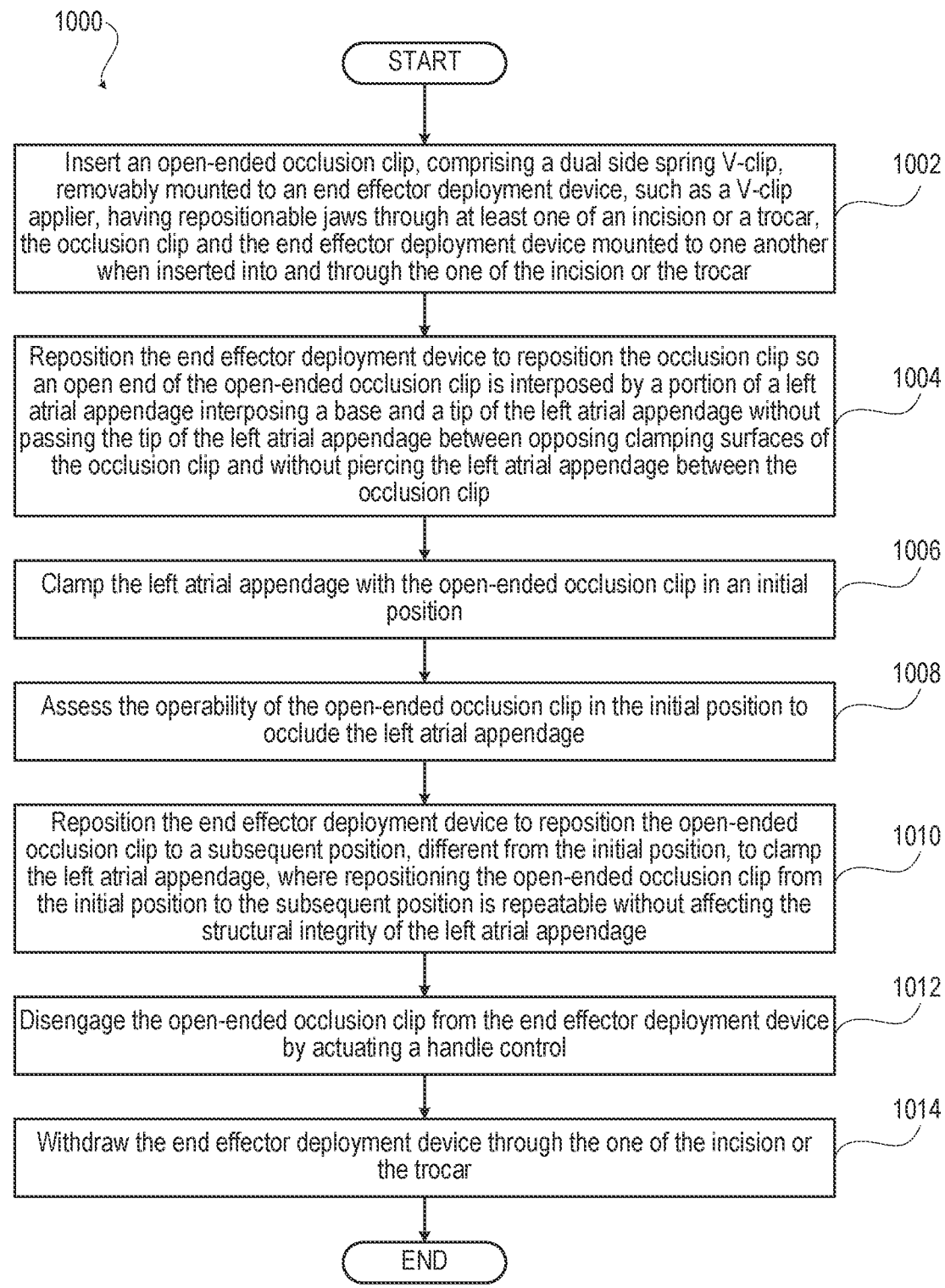
FIG. 10 depicts a flow diagram presenting a method of deploying an occlusion clip, specifically a dual side spring V-clip to occlude an LAA, according to one or more embodiments.

FIG. 10 depicts a flow diagram presenting a method 1000 of deploying an occlusion clip, specifically a dual side spring V-clip to occlude an LAA. Components referenced in method 1000 can be identical or similar components described above for FIGS. 1A-1B, 2-8, and 9A-9G and in the documents incorporated by reference herein. Method 1000 can include inserting an open-ended occlusion clip, comprising a dual side spring V-clip, removably mounted to an end effector deployment device, such as a V-clip applier, having repositionable jaws through an incision or a trocar, the occlusion clip and the end effector deployment device mounted to one another when inserted into and through the one of the incision or the trocar (block 1002). Method 1000 can include repositioning the end effector deployment device to reposition the occlusion clip so an open end of the open-ended occlusion clip is interposed by a portion of a left atrial appendage interposing a base and a tip of the left atrial appendage without passing the tip of the left atrial appendage between opposing clamping surfaces of the occlusion clip and without piercing the left atrial appendage between the occlusion clip (block 1004). Method 1000 can include clamping the left atrial appendage with the open-ended occlusion clip in an initial position (block 1006). Method 1000 can include assessing the operability of the open-ended occlusion clip in the initial position to occlude the left atrial appendage (block 1008). Method 1000 can include repositioning the end effector deployment device to reposition the open-ended occlusion clip to a subsequent position, different from the initial position, to clamp the left atrial appendage, where repositioning the open-ended occlusion clip from the initial position to the subsequent position is repeatable without affecting the structural integrity of the left atrial appendage (block 1010). Method 1000 can include disengaging the open-ended occlusion clip from the end effector deployment device by actuating a handle control (block 1012). Method 1000 can include withdrawing the end effector deployment device through the one of the incision and the trocar (block 1014).

In one or more embodiments, a method is provided for deploying an occlusion clip such as a side spring V-clip. The method can include inserting an open-ended occlusion clip removably mounted to an end effector deployment device, having repositionable jaws, through at least one of an incision and a trocar, the open-ended occlusion clip biased to a clamping position. The method can include repositioning the end effector deployment device to counteract a bias of the open-ended occlusion clip and reposition the open-ended occlusion clip to a tissue insertion position where the full bias of the open-ended occlusion clip is not applied to a left atrial appendage tissue. The method can include repositioning the end effector deployment device to reposition the open-ended occlusion clip in the tissue insertion position so a portion of a left atrial appendage between a base and a tip of the left atrial appendage interposes the open-ended occlusion clip without ever having a tip of the left atrial appendage interpose the open-ended occlusion clip. The method can include repositioning the open-ended occlusion clip to apply the full bias to the left atrial appendage.

In one or more embodiments, the method can further include inserting the end effector during at least one of an open sternotomy, a left thoracotomy, a right thoracotomy, a left port procedure, a right port procedure, a subxiphoid approach, and a transdiaphragmatic approach. In a further detailed embodiment, the method can include insufflating a thoracic space prior to the inserting end effector. In still a further detailed embodiment, the method can include making an incision as part of a procedure including at least one of an open sternotomy, a left thoracotomy, a right thoracotomy, a left port procedure, a right port procedure, a subxiphoid approach, and a transdiaphragmatic approach, and introducing a trocar through the incision. In a more detailed embodiment, the end effector deployment device is mounted to a longitudinal conduit, which is mounted to a hand-held device. Repositioning the end effector deployment device can include actuating at least one of a first control and a second control associated with the hand-held device to actively reposition the end effector within at least one of an X-Y plane and a Y-Z plane with respect to the hand-held device. In a more detailed embodiment, the end effector deployment device can be mounted to a longitudinal conduit, which is mounted to a hand-held device. The open-ended occlusion clip can be repositioned from a compressed position to an expanded position prior to interposing a portion of the left atrial appendage between the opposing clamping surfaces. In another more detailed embodiment, the method can include actuating a handle associated with the hand-held device to direct repositioning of the open-ended occlusion clip between the compressed position and the expanded position. In yet another more detailed embodiment, actuating the handle can cause a pair of jaws associated with the end effector to reposition with respect to one another, and the pair of jaws is mounted to the open-ended occlusion clip. In still another more detailed embodiment, the end effector deployment device can be mounted to a longitudinal conduit, which is mounted to a hand-held device, the method further comprising rotationally repositioning the open-ended occlusion clip with respect to the left atrial appendage by rotating the hand-held device.

In yet another more detailed embodiment, the method can include grasping the left atrial appendage concurrent with repositioning the end effector deployment device to reposition the occlusion clip so the open end of the open-ended occlusion clip is interposed by the portion of the left atrial appendage. In yet another more detailed embodiment, the method can include confirming application of the full bias of the open-ended occlusion clip is operative to occlude the left atrial appendage using at least one of visualization and a transesophageal echocardiogram. In a further detailed embodiment, the method can include disengaging the open-ended occlusion clip from the end effector deployment device, where the end effector deployment device is mounted to a longitudinal conduit, which is mounted to a hand-held device, and disengaging the open-ended occlusion clip from the end effector deployment device includes actuating a control associated with the hand-held device. In still a further detailed embodiment, the control can comprise a repositionable tab operatively coupled to a wire, which is operatively coupled to the end effector and the open-ended occlusion clip, and removing the repositionable tab from the hand-held device repositions the wire with respect to at least one loop encompassing at least one of the open-ended occlusion clip and the end effector deployment device in order to disengage the open-ended occlusion clip from the end effector deployment device. In a more detailed embodiment, the inserting step can include inserting the open-ended occlusion clip and the end effector deployment device through the trocar, and the trocar comprises a twelve millimeter or less diameter orifice. In a more detailed embodiment, the end effector deployment device can be mounted to a longitudinal conduit, which is mounted to a hand-held device, and the step of repositioning the end effector deployment device to reposition the open-ended occlusion clip includes locking a position of the end effect deployment device in at least one of an X-Y plane and a Y-Z plane with respect to the hand-held device.

Unless specifically indicated, it will be understood that the description of the structure, function, and/or methodology with respect to any illustrative embodiment herein may apply to any other illustrative embodiments. More generally, it is within the scope of the present disclosure to utilize any one or more features of any one or more example embodiments described herein in connection with any other one or more features of any other one or more other example embodiments described herein. Accordingly, any combination of any of the features or embodiments described herein is within the scope of this disclosure.

Following from the above description and invention summaries, it should be apparent to those of ordinary skill in the art that, while the methods and apparatuses herein described constitute example embodiments according to the present disclosure, it is to be understood that the scope of the disclosure contained herein is not limited to the above precise embodiments and that changes may be made without departing from the scope of the disclosure. Likewise, it is to be understood that it is not necessary to meet any or all of the identified advantages or objects disclosed herein in order to fall within the scope of the disclosure, since inherent and/or unforeseen advantages may exist even though they may not have been explicitly discussed herein.

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An apparatus comprising:
   a first elongate beam;
   a second elongate beam positionable between a closed state in parallel alignment with the first elongate beam and an open state being a distally angled away from the first elongate beam in a V-shape;
   a dual side spring assembly configured to urge the first and the second elongate beams from an open position to a closed position, wherein the dual side spring assembly comprises a right-side spring and a left-side spring each having first and second terminal ends attached to distal sections respectively of the first and the second elongate beams and extending proximally to a respective proximal bend; and
   a lateral spacing element attached between respective proximal bends of the right-side spring and the left-side spring, wherein the lateral spacing element maintains parallel alignment to resist lateral splaying movement of the first and second elongate beams,
   wherein each of the right-side spring and the left-side spring in a free state present crossed distal ends having a reverse bend as compared to the bend at a midpoint, and wherein the right-side spring and the left-side spring each have separated distal ends in the free state.

2. The apparatus of claim 1, wherein each of the first and second terminal ends of the right-side spring and the left-side spring comprise an anti-rotation feature attached by overmolding to corresponding distal sections of the first and the second elongate beams.

3. The apparatus of claim 2, wherein the anti-rotation feature comprises one or of a polygonal head, an undercut portion, a flat portion, a spline portion, a hole, and a swage.

4. The apparatus of claim 1, wherein:
   the first and the second terminal ends of the right-side spring are aligned at a first longitudinal position on the right side of each of the first and the second elongate beams; and
   the first and the second terminal ends of the left-side spring are aligned at the first longitudinal position on the left side of each of the first and the second elongate beams, the right-side spring and the left-side spring being identically sized.

5. The apparatus of claim 1, wherein:
the first and the second terminal ends of the right-side spring are aligned at a first longitudinal position on the right side of each of the first and the second elongate beams; and
the first and the second terminal ends of the left-side spring are aligned at a second longitudinal position on the left side of each of the first and the second elongate beams, the second longitudinal position longitudinally spaced from the first longitudinal position, the right-side spring and the left-side spring being differently longitudinally sized.

6. The apparatus of claim 1, wherein the first and the second elongate beams comprise atraumatic inward surfaces.

7. The apparatus of claim 1, further comprising one or more materials compatible with surgical implantation on a left atrial appendage of a heart of a patient.

\* \* \* \* \*